(12) United States Patent
Wipf

(10) Patent No.: US 10,173,848 B2
(45) Date of Patent: Jan. 8, 2019

(54) CONVEYING ARRANGEMENT

(71) Applicant: Robert Bosch GmbH, Stuttgart (DE)

(72) Inventor: Alfred Wipf, Jestetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/576,868

(22) PCT Filed: May 19, 2016

(86) PCT No.: PCT/EP2016/061228
§ 371 (c)(1),
(2) Date: Nov. 27, 2017

(87) PCT Pub. No.: WO2016/188843
PCT Pub. Date: Dec. 1, 2016

(65) Prior Publication Data
US 2018/0162659 A1    Jun. 14, 2018

(30) Foreign Application Priority Data

May 26, 2015 (DE) ........................ 10 2015 209 613

(51) Int. Cl.
*B65G 47/08* (2006.01)
*B65G 47/51* (2006.01)
(Continued)

(52) U.S. Cl.
CPC .......... *B65G 54/02* (2013.01); *B65G 47/088* (2013.01); *B65G 47/71* (2013.01); *B65G 47/842* (2013.01);
(Continued)

(58) Field of Classification Search
CPC ...... B65G 54/02; B65G 47/088; B65G 47/71; B65G 47/842; B65G 45/10;
(Continued)

(56) References Cited

U.S. PATENT DOCUMENTS 8,474,598 B2 * 7/2013 Huber ................. B65G 47/084
198/426
9,187,268 B2 * 11/2015 Denninger ............. B65G 54/02
(Continued)

FOREIGN PATENT DOCUMENTS

DE   3207971   9/1983
DE   4315373   11/1994
(Continued)

OTHER PUBLICATIONS

International Search Report for Application No. PCT/EP2016/061228 dated Jul. 8, 2016 (English Translation, 3 pages).

*Primary Examiner* — Mark A Deuble
(74) *Attorney, Agent, or Firm* — Michael Best & Friedrich LLP

(57) ABSTRACT

The invention relates to a conveying arrangement comprising at least one mover (20) which has at least one permanent magnet (19) connected to the mover (20), said permanent magnet (19) cooperating with at least one coil plane (18) of a drive surface (13) to drive the mover (20) particularly without contact, and further comprising at least one conveying system (30, 38), preferably conveying products (32), characterized in that the conveying system (30, 38), preferably a conveyor belt, is arranged between the drive surface (13) and the mover (20).

20 Claims, 14 Drawing Sheets

(51) Int. Cl.
*B65G 47/71* (2006.01)
*B65G 47/86* (2006.01)
*B65G 54/02* (2006.01)
*B65G 65/00* (2006.01)

(52) U.S. Cl.
CPC .......... *B65G 47/5145* (2013.01); *B65G 65/00* (2013.01); *B65G 2201/02* (2013.01); *B65G 2203/0208* (2013.01); *B65G 2203/042* (2013.01)

(58) Field of Classification Search
CPC ........ B65G 2201/0202; B65G 2207/26; B65G 47/70; B65G 47/715
See application file for complete search history.

(56) References Cited

U.S. PATENT DOCUMENTS

| | | | | |
|---|---|---|---|---|
| 2003/0005665 | A1* | 1/2003 | Wipf | B65B 9/06 53/450 |
| 2007/0046221 | A1* | 3/2007 | Miyakawa | H01L 21/682 318/135 |
| 2007/0295579 | A1* | 12/2007 | Hysell | B65G 47/844 198/370.02 |
| 2009/0315413 | A1* | 12/2009 | Iwatani | G03B 27/58 310/12.26 |
| 2010/0084247 | A1* | 4/2010 | Wipf | B65G 19/02 198/617 |
| 2013/0034410 | A1* | 2/2013 | Heise | B65G 54/02 414/222.13 |
| 2013/0126302 | A1* | 5/2013 | Johns | B01D 21/262 198/439 |
| 2015/0217886 | A1* | 8/2015 | Blanz | B65B 23/14 198/418.9 |
| 2017/0158435 | A1* | 6/2017 | Wiesmann | B07C 5/36 |
| 2017/0334663 | A1* | 11/2017 | Ragan | B65G 47/715 |
| 2018/0148268 | A1* | 5/2018 | Wipf | B65G 45/10 |

FOREIGN PATENT DOCUMENTS

| | | |
|---|---|---|
| DE | 102011085724 | 5/2013 |
| EP | 1123889 | 8/2001 |
| JP | 585620 | 4/1993 |
| WO | 2010142021 | 12/2010 |
| WO | 2013059934 | 5/2013 |
| WO | 2014159317 | 10/2014 |

* cited by examiner

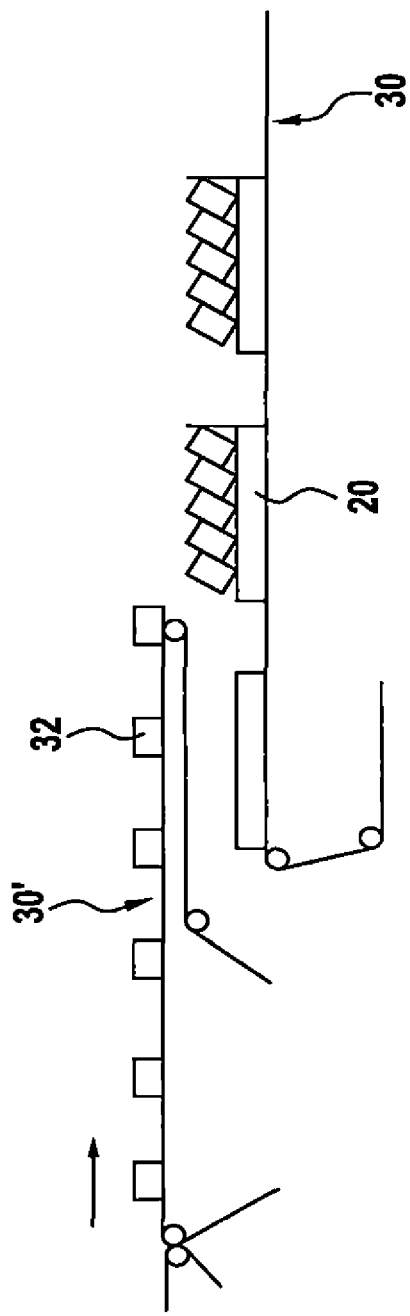

CONVEYING ARRANGEMENT

BACKGROUND OF THE INVENTION

The invention proceeds from a transportation device.

Transportation systems in which the transportation elements (so-called movers) are borne in an almost frictionless manner in the electromagnetic field are known. The adjustable electromagnetic forces are used both for the propulsion of the transportation elements as well as for the electromagnetic linear bearing or levitation across a flat and electrically excited transportation area (also referred to as the X-Y stator). Such a system is described in WO 2013/059934 A1.

A device and a method for transferring products by means of grippers are already known from EP 2441307 B1. The device comprises a linear motor having conveyed quantities that are guided in a displaceable manner on a guide, having a gripper arm for temporarily receiving products, wherein the guide is configured as a linear guided section. The conveyed quantities are displaceable in a reciprocating manner on the guided section in order for the products to be received and deposited, wherein in the case of products that in the conveying direction of the infeed conveyor belt are sequentially infed in one line, the infeed conveyor belt, the outfeed conveyor belt, and the guided section in at least one lateral overlap region are disposed beside one another in a parallel manner. In the case of products which in the conveying throughput of the infeed conveyor belt are infed beside one another in rows, the infeed conveyor belt is disposed so as to be perpendicular to the outfeed conveyor belt, and the outfeed conveyor belt and the guided section are disposed so as to be mutually parallel and so as to be disposed beside one another together with the infeed conveyor belt in at least one lateral overlap region.

A device of the generic type for grouping articles or containers is also known from DE 102011085724 A1.

SUMMARY OF THE INVENTION

By contrast, the device according to the invention, has the advantage that the flexibility is further increased. This is achieved according to the invention in that the transportation system, preferably a transportation belt, is disposed between the propulsion surface and the mover. Specifically on account of this arrangement it becomes possible also for products that are infed in a non-organized manner to be able to be received in the desired manner by the mover and for said products to be grouped in a flexible manner by said mover. Moreover, the transportation system can also be utilized for transporting a mover per se, in particular in such regions which are not provided with a propulsion surface. Propulsion surfaces can thus be reduced under certain circumstances. On account thereof, the device is further reduced in terms of cost. Moreover, the movers could be shunted to a maintainance position or similar, for example.

Moreover, a change of format can be performed by pushing a button, so to speak, such that packaging steps or processing steps, respectively, can be provided in a targeted manner for each product individually. On account of the use of a so-called planar drive, the receiving and depositing paths of the mover that conveys the product can be predefined individually. An individual adaptation to the product streams or containers, respectively, can be performed by movers that are individually controllable. The product has to be handled only once even along different processing steps, such that further interfaces in terms of product handling can be dispensed with. The concept described contributes toward mechanical standardization since the same transportation system can be used for the most varied processing steps. System components that have been used to date can be dispensed with, contributing to a reduction in terms of cost. The transportation system is no longer dependent on individual guides or similar. The speed of the movers can also be individually controlled and thus be adapted to desired movement profiles of the further transportation systems. On account thereof, the speed of transportation can also be optimized. Moreover, a configuration of the propulsion surface that is free of gaps can be achieved, this facilitating cleaning capability.

A particularly compact construction can be achieved thanks to the proposed device. Only a small space is required since minimal handling of the products is required by virtue of the flexible movement paths of the movers. Moreover, various functions such as, for example, distributing, cycling, or grouping without interfaces, and the transfer of products can be implemented. Only good products are packaged. Bad products can be identified and be ejected by the movers. Moreover, the device is distinguished by a modular expandability. Moreover, a rapid format change becomes possible. The cleaning capability is likewise improved. Moreover, the supply of downstream machines can be performed in an optimal manner since it is possible for the desired product groupings to be performed in a particularly flexible manner. Infeed can moreover be performed in a non-contacting manner. The propulsion surface lies below the transportation system such that good accessibility and visibility in terms of the process or the products, respectively, can be maintained.

In one expedient refinement, at least one product detector or sensor, respectively, is provided in the region of the transportation system, preferably outside the propulsion surface. On account thereof, an identification of the position of the products to be moved can be carried out in a particularly simple manner. This is advantageous specifically in the case of products that are infed in a non-organized manner. Moreover, the product detector could also be used for other purposes such as, for example, quality control of the products, and would thus already be available anyway.

In one expedient refinement, it is provided that the mover approaches a specific position depending on the product detector or the sensor, respectively, so as to move the identified or sensed product, respectively. In conjunction with, for example, the speed of the transportation system a controller determines the position that is to be approached by the mover such that the product can thus be moved to the desired position in a reliable manner. The operational reliability and the accuracy of the device are thus enhanced.

In one expedient refinement it is provided that the mover is brought up to a speed which corresponds approximately to a speed of the transportation system. Particularly gentle product handling can thus be achieved in that an almost impact-free transfer or receipt, respectively, of the product can be implemented by the mover.

In one expedient refinement it is provided that the mover moves at least one product relative to the transportation system, preferably so as to provide said product with a change of direction and/or a rotation. The mover (or a plurality of movers, respectively) can thus dispose the products in a desired manner, for example in the form of rows and/or in specific groups, on the same transportation system on which the products have also been infed. Products which have been infed in a non-organized manner can thus be organized in a simple manner. On account thereof, the transfer of products that are now organized to further transportation systems can be carried out accurately in the desired manner while taking into account especially the downstream processing steps.

In one expedient refinement at least one further transportation system is provided so as to be adjacent to the transportation system and/or to the propulsion surface. As has already been stated above, organized infeeding to a further transportation system can thus be achieved in a particularly simple manner since now the mover does not only perform the organization of the products but also implements the transfer from the one transportation system to the next transportation system. The mover can thus assume further tasks.

In one expedient refinement it is provided that the mover moves the product onto the transportation system and/or onto the further transportation system and/or onto a buffer and/or onto a packaging material. Depending on the further processing steps desired, the mover selects in a flexible manner where the products are to be transferred to. In the case of the transfer onto a buffer, products can thus be temporarily stored in a particularly simple manner in order for said products to be returned to the further processing process at a suitable point in time. In the case of a transfer onto the packaging material, a packaging process could follow on a horizontal bag forming and filling machine, for example. The flexibility in terms of the arrangement is further increased.

In one expedient refinement it is provided that the mover upon transferring at least one product to the further transportation system reaches a region of the propulsion surface that is not covered by the transportation system. In one expedient refinement it can moreover be provided that the propulsion surface is configured such that the latter is not completely covered by the transportation system and/or by the further transportation system. This region of the propulsion surface can thus be used for returning the mover in a targeted manner in order for products to be received and/or dispensed again. Movers that are returned in this manner do not impede the transportation of the products on the further transportation system.

In one expedient refinement it is provided that the further transportation system is disposed between the propulsion surface and the mover. The mover can thus also move the products in a targeted manner in the region of the further transportation system, transfer said products to the desired grouping, or similar.

In one expedient refinement it is provided that the mover, in particular in a shunting manner, transfers the product from the one transportation system to the further transportation system. The mover in the case of this variant is configured in a particularly simple manner since said mover does not have to have an activation element which requires the product to be lifted. The activation element per se can also be rigidly connected to the mover, or can already be part of the mover per se, since a respective change of movement can be performed by way of the mover per se.

In one expedient refinement it is provided that the mover comprises at least one activation means which for transporting at least one product comes into contact with the latter. A corresponding activation means can be designed for the respective shape of the product in order for said product to be handled or gripped in a particularly gentle manner.

In one expedient refinement it is provided that at least one mover moves the product to a position which depends on a position of a product that has already been moved by a mover. It is thus possible for the mover to group the products in a desired manner, for example sequentially in rows or columns, respectively, or in similar arrangements.

In one expedient refinement it is provided that the mover in the region of the transportation system moves parallel with or counter to or obliquely to a transportation direction of the transportation system. The region of the transportation system for returning the mover to a position in which a new product is being received again can thus also be utilized.

In one expedient refinement it is provided that the direction of movement of the further transportation system is oriented so as to be parallel with and/or perpendicular to and/or at any arbitrary angle to the direction of movement of the transportation system. Depending on the specific application, the mover can infeed products in a targeted manner to suitably disposed transportation systems. On account thereof, the flexibility of the device is further increased.

In one expedient refinement the transportation system and/or the further transportation system are/is configured such that at least two products can be disposed beside one another in relation to the respective transportation direction. The movers can thus dispose the products in two or more columns, for example, which can be infed to parallel packaging processes.

In one expedient refinement it is provided that the mover moves at least two products. The output of the system is increased on account thereof. At least two movers are particularly preferably provided.

In one expedient refinement it is provided that the mover carries the at least one product in particular on the upper side of said mover. The handling of the products can be further simplified on account thereof, since the mover does not necessarily have to have activation means.

In one expedient refinement it is provided that the mover shunts at least one product onto a plane, without lateral guides being necessary. The measuring system can preferably identify the position of the product as well as the position of the mover in a continuous manner, and the mover can be actuated in such a manner that the product is conveyed in the desired direction.

BRIEF DESCRIPTION OF THE DRAWINGS

Exemplary embodiments of the device according to the invention are illustrated in the drawing and are described in more detail hereunder.

In the drawing:

FIG. 14 shows a further alternative exemplary embodiment in which a plurality of products are infed to one mover such that said products come to lie beside one another.

DETAILED DESCRIPTION

Figure 1:
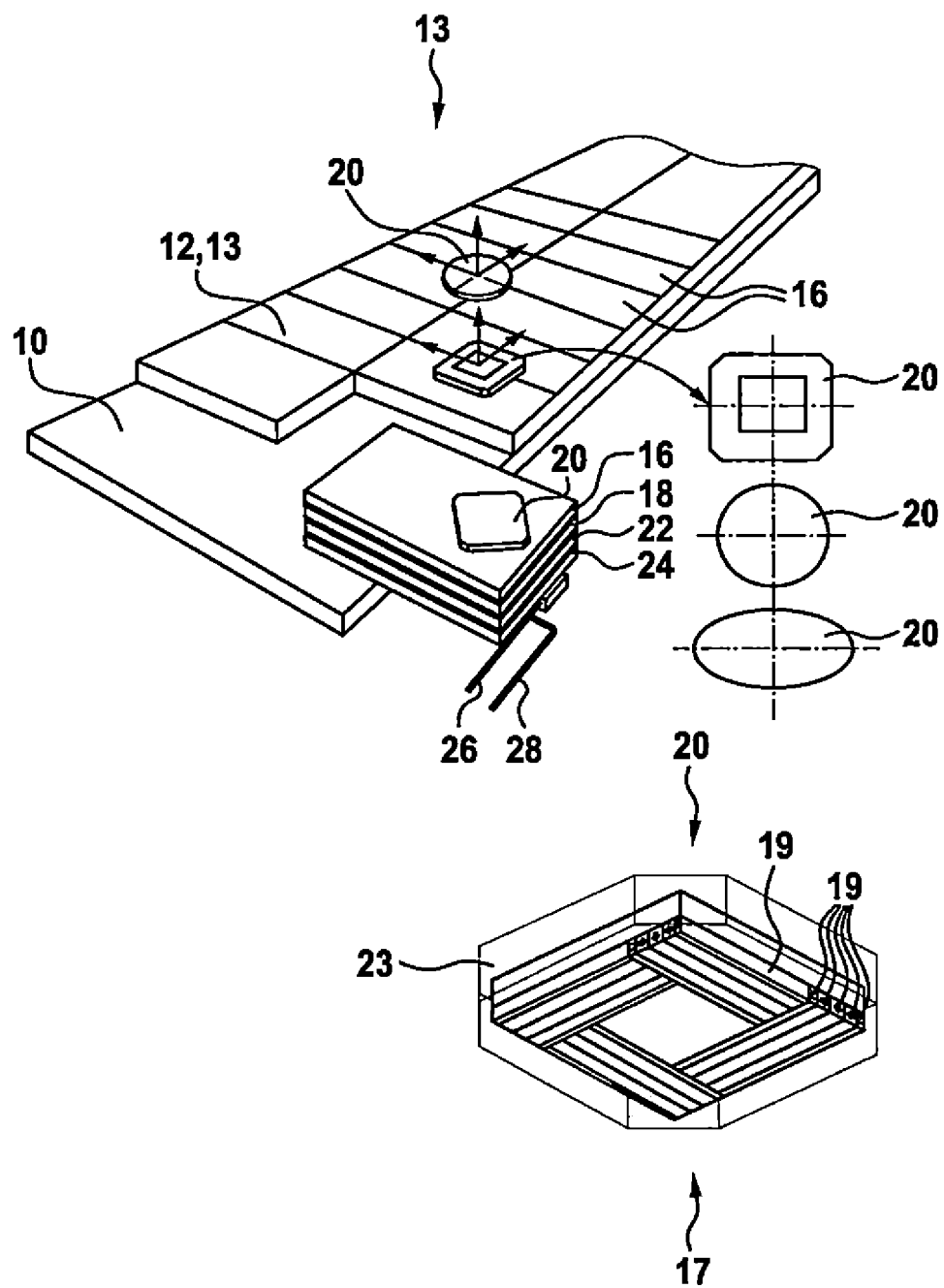
FIG. 1 shows a perspective view of the transportation device.

In the case of the exemplary embodiment according to FIG. 1, two movers 20 having dissimilar basic shapes are illustrated in an exemplary manner, specifically one substantially rectangular mover 20, and one round mover 20, respectively. An oval design embodiment or else an other design embodiment would also be conceivable. The carrier plate 12, or the propulsion surface 13, respectively, is composed of a plurality of individual parts, or tiles 16, respectively. The tiles 16 are configured so as to be square or rectangular, respectively. The tiles 16 have a substantially planar surface and are constructed in layers. The tile 16 thus comprises a coil plane 18, a sensor plane 22, and a power electronics plane 24. A bus system 26 which connects the tiles 16 to a central computer or processor (neither illustrated), respectively, is furthermore provided. Moreover, a voltage supply 28 having associated connectors, by way of which the power electronics plane 24, or the coil plane 18 and/or the sensor plane 22, respectively, can be supplied with power is provided.

The basic platform 10 defines the basic element. The necessary spatial design possibilities of the system are derived from the latter. The basic platform 10 is understood to be the system carrier or a machine frame, respectively. Said basic platform 10 has to have the required rigidity. The basic platform 10 can already receive control components and power electronics. The carrier plate 12, or the propulsion surface 13, respectively could optionally already also be a component part of the basic platform 10. The basic platform 10 forms the base or the element for disposing further functional units. The basic platform 10 is furthermore the base or the element for disposing further transportation systems. The basic platform 10 is to be compatible with other basic platforms. The movers 20 which are movable relative to the propulsion surface 13 are disposed on the surface of the basic platform 10, so as to be on the propulsion surface 13. To this end, the propulsion surface 13, or the carrier plate 12, respectively, generates a propulsion force which acts on the mover 20 and sets the latter in the desired motion. The stationary propulsion surface 13 is preferably embodied so as to be planar. The mover 20 is actuated such that said mover 20 is displaceable and/or rotatable in at least two degrees of freedom. In particular, various stations can thus be approached in a flexible manner as will be described hereunder when the propulsion surface 13 interconnects said stations in a suitable manner.

The mover 20 defines the movable element of the device. The mover 20 serves for generating a relative movement in relation to the carrier plate 12, or to the propulsion surface 13, respectively, on the one hand. There is furthermore an interaction between the movers 20 or between the components of the movers. Furthermore, the mover 20 exerts a force on the carrier plate 12, or on the propulsion surface 13, respectively. To this end, the mover 20 for generating a magnetic field comprises at least one means, in particular at least one magnet, preferably a permanent magnet 19, which interacts with coils 18 of the carrier plate 12, or of the propulsion surface 13, respectively, that generate a travelling field for generating movement. An air gap between the carrier plate 12, or the propulsion surface 13, respectively, and the mover 20 is formed herein such that a non-contacting movement of the mover 20 can be performed in relation to the propulsion surface 13. The mover 20 can furthermore have means for identifying a position.

The mover 20 is illustrated in a perspective manner in a view of FIG. 1. A lower side 17 of the mover 20 interacts with the carrier plate 12, or the propulsion surface 13, respectively. A plurality of permanent magnets 19 are disposed on the lower side 17 of the mover 20. The magnetic fields of permanent magnets 19 that are disposed so as to be adjacent are dissimilar. The lower side 17 is composed of substantially four fields, each having a plurality of permanent magnets 19. The central region of the lower side 17 does not have any permanent magnets 19. Further alternative design embodiments which are incorporated in the disclosure of the present application are specified in WO 2013/059934 A1. The mover 20 is surrounded by a collision protection 23, this being advantageous in the case of a multiplicity of moving movers 20.

The carrier plate 12, or the propulsion surface 13, respectively, represents a multi-layered component according to illustration 1. Said carrier plate 12, or said propulsion surface 13, respectively, has the following basic functions. On the one hand, said carrier plate 12, or said propulsion surface 13, respectively, comprises means for generating a relative movement in relation to the mover 20. Moreover, a force which acts on the mover 20 is generated. Said carrier plate 12, or said propulsion surface 13, respectively, moreover comprises means for generating spacings (air gap) between the carrier plate 12 and the mover 20. Moreover, the carrier plate 12 comprises means for identifying positions and means for transmitting items of information.

Figure 2:
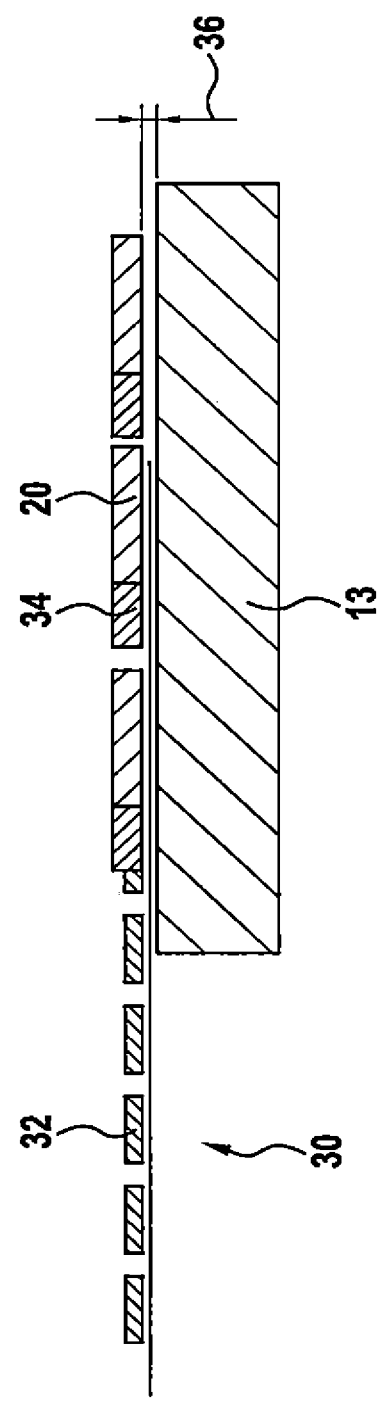
FIG. 2 shows a sectional illustration of the entire device.

In the case of the exemplary embodiment according to FIG. 2, a transportation system 30 conveys products 32 to the acquisition range of the propulsion surface 13. The transportation system 30 is disposed between the upper side of the propulsion surface 13 and the lower side of the movers 20. A spacing 36 which is sufficiently large for receiving the transportation system 30, or parts thereof, respectively, is formed between the lower side of the movers 20 and the upper side of the propulsion surface 13. The transportation system 30 can be a transportation belt, for example. The mover 20 moreover has at least one activation means 34. The activation means 34 is designed such that said activation means 34 can receive or contact, respectively, the products 32 that are infed from the transportation system 30 and can transfer or shunt, respectively, said products 32 to another location, as will be explained hereunder.

Figure 3:
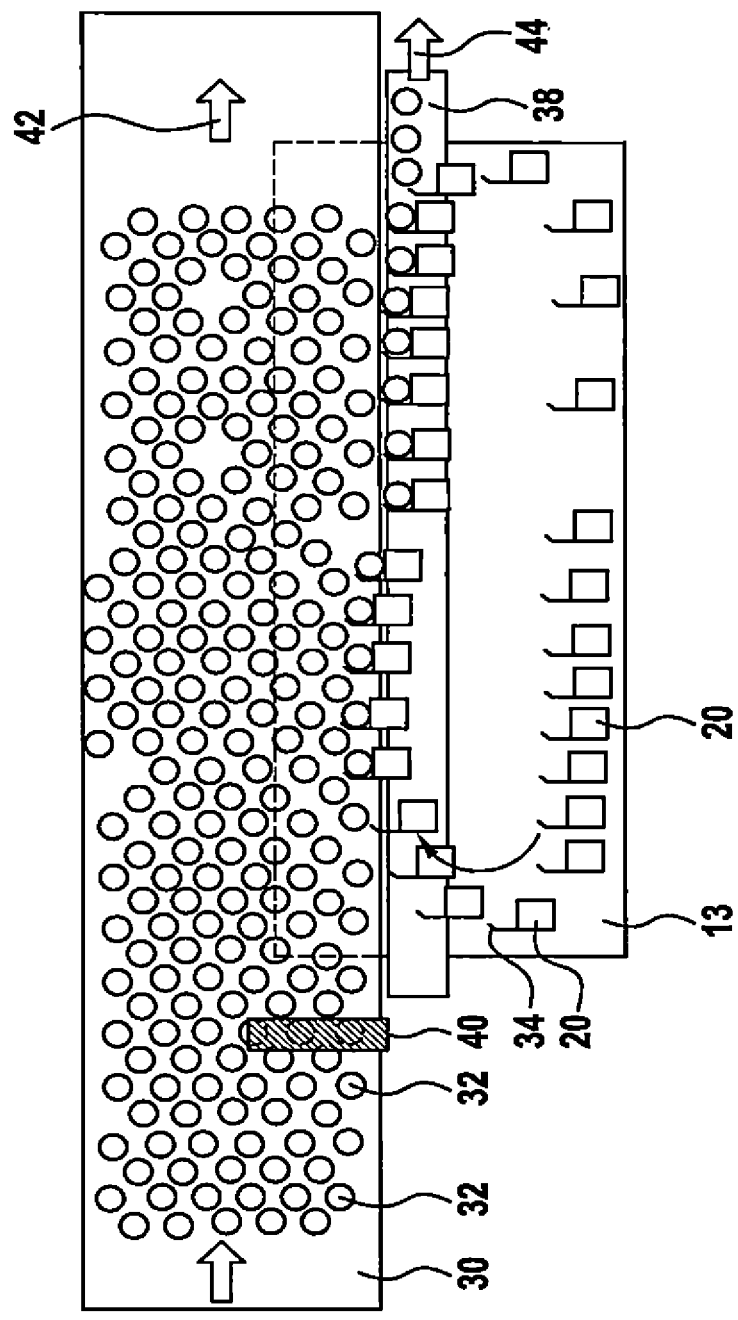
FIG. 3 shows a plan view of a transportation system having the infeed and the outfeed belt in parallel.

A first exemplary embodiment of a transportation device is illustrated in the plan view in FIG. 3. A multiplicity of products 32 are infed by way of the transportation system 30. To this end, a plurality of products 32 can be disposed in a non-organized manner and/or beside one another (so as to be perpendicular to the transportation direction 42 of the transportation system 30). At least the external part of the transportation system 30 is provided with a product detector 40, or a sensor, respectively. To this end, the product detector 40 is installed so as to be stationary in relation to the transportation system 30 at a location which enables an unimpeded inspection of the products 32. The product detector 40 aquires the position and/or the point in time at which the respective product 32 reaches the aquisition range of the product detector 40. The product detector 40 is preferably disposed outside the propulsion surface 13 but could also be positioned within the propulsion surface 13. However, it is essential that the position of the products 32 that are infed from the transportation system 30 is reliably identified such that respective movers 20 receive a respective product 32 when the latter reaches the detection range of the mover 20 having the associated propulsion surface 13. The product detector 40 can also be used for checking the products 32 in terms of their proper state, so as to implement quality control. The improper products 32 could thus be ejected at a specified location by corresponding movers 20.

In a first set of tasks, some of the infed products 32 are to be transferred from the transportation system 30 to a further transportation system 38. To this end, the further transportation system 38 is disposed so as to be parallel with the transportation system 30 and to be directly adjacent to the latter. The transportation directions 42, 44 of the transportation systems 30, 38 are thus identical. The further transportation system 38 also at least partially covers the propulsion surface 13 and lies between the upper side of the propulsion surface 13 and the lower side of the movers 20. In a first step, those products 32 that already lie on that periphery of the transportation system 30 that is adjacent to the further transportation system 38 are transferred by the movers 20 to the further transportation system 38. Once the respective position of the outer product 32 has been transmitted by the product detector 40 to a controller (not illustrated), the latter computes therefrom a nominal position for the next mover 20 which receives the product 32 at said nominal position in that the associated activation means 34 of the mover 20 comes into contact with said product 32. To this end, the appropriate mover 20 is accelerated to substantially the speed of the product 32 to be shunted. The mover 20 in terms of speed steadily approximates the speed of the product 32. Said mover 20 then receives the product 32 in an almost impact-free manner. The mover 20 herein moves the activation means 34 such that the latter can receive the product 32, or come into contact with the latter, respectively. The direction and/or the speed of the mover 20 are/is subsequently changed such that the product 32 to be shunted is transferred from the transportation system 30 to the further transportation system 38. The mover 20 is synchronized with the speed of the further transportation system 38. This further transportation system 38 could be operated at almost the same speed as the transportation system 30; however, this is not required by virtue of the synchronization potential of the mover 20.

Once the product 32 is located at the desired location in the further transportation system 38, for example at the desired spacing from the preceding product 32 and/or in the desired row, the mover 20 decelerates in the manner such that the product 32 is released from the activation means 34 of the mover 20. The mover 20 subsequently moves out of the acquisition range of the further transportation system 38. The mover 20, on that part of the propulsion surface 13 that is not covered by one of the transportation systems 30, 38, returns counter to the transportation directions 42, 44 to the proximity of the starting region of the further transportation system 38. The next product 32 to be shunted is approached there in the manner as has already been described. This procedure is repeated for each individual mover 20 for a multiplicity of products 32 to be shunted, as can be seen in the further FIGS. 4 and 5. It can be derived from these figures that rows of products 32 that are increasingly inward are transferred. However, this is possible only for as long as the propulsion surface 13 is still covered by the transportation system 30.

Figure 4:
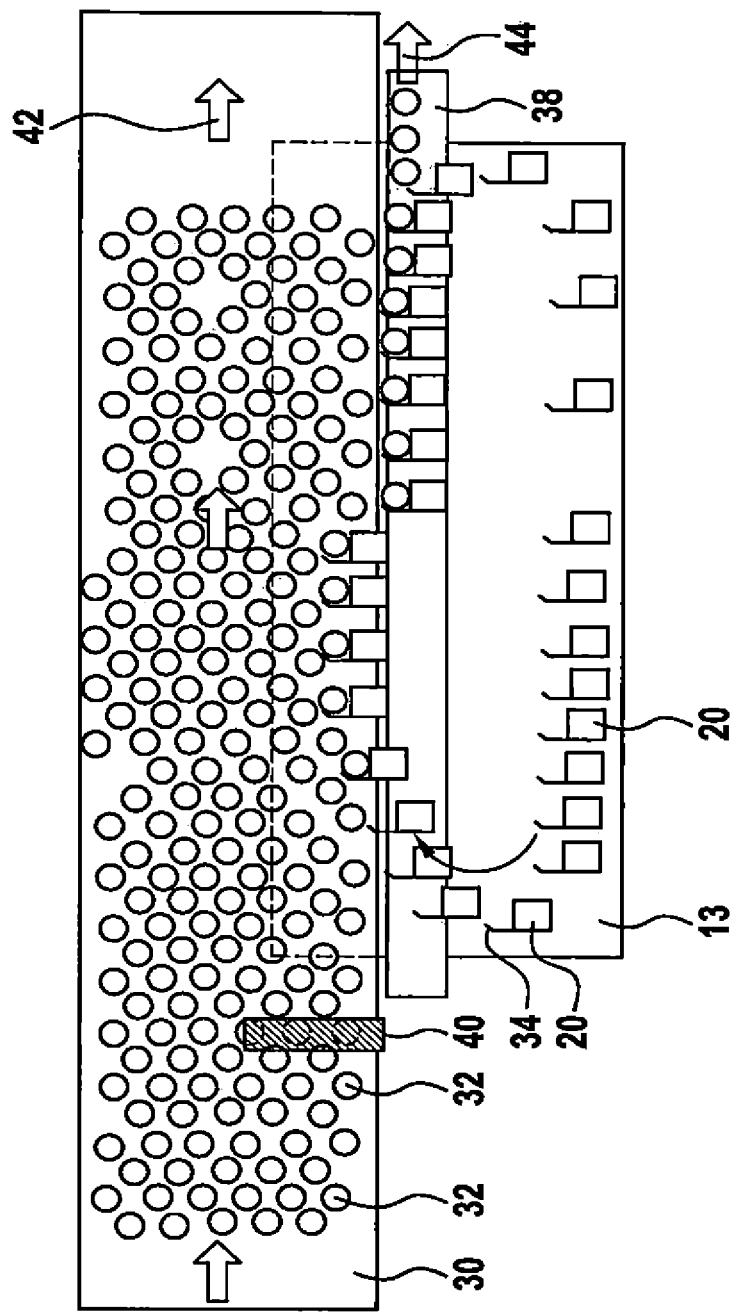
FIG. 4 shows a plan view of the transportation system according to FIG. 3 in a state in which further products have already been transferred.
Figure 5:
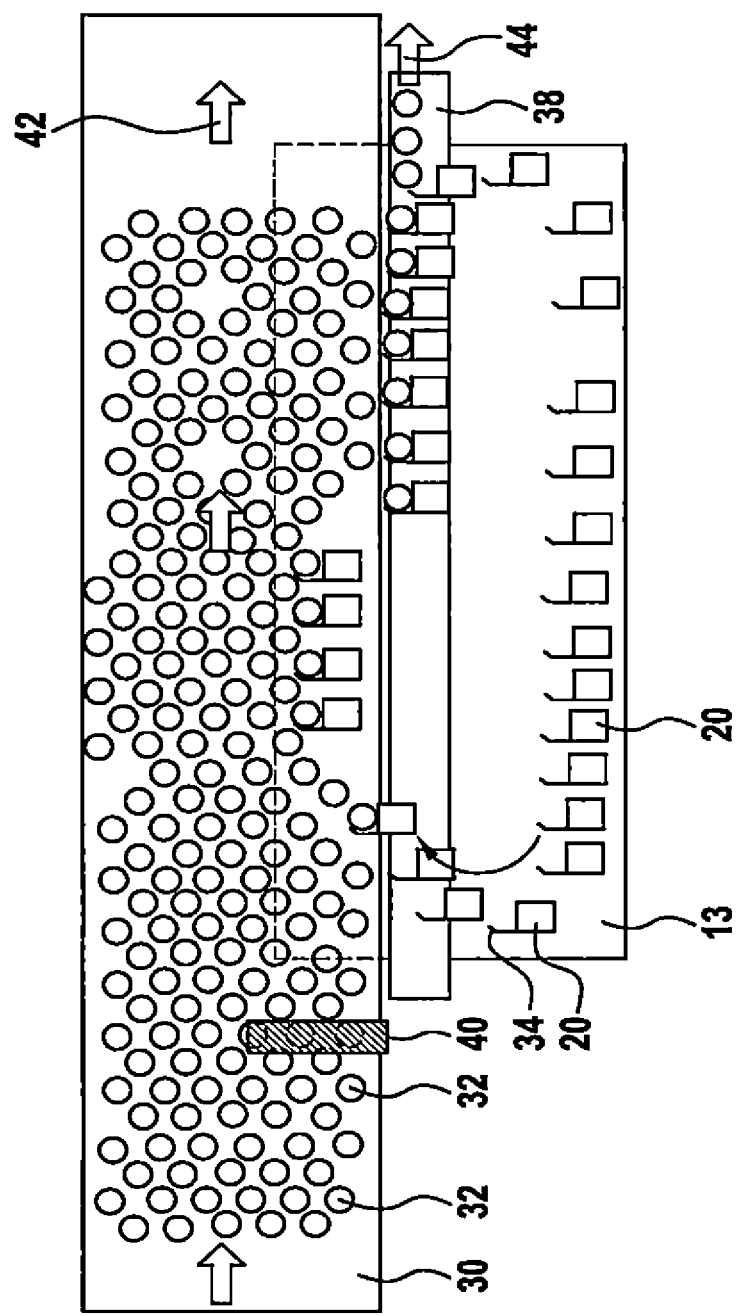
FIG. 5 shows a plan view of the transportation system according to FIG. 3 in a state in which even further products have been transferred.
Figure 6:
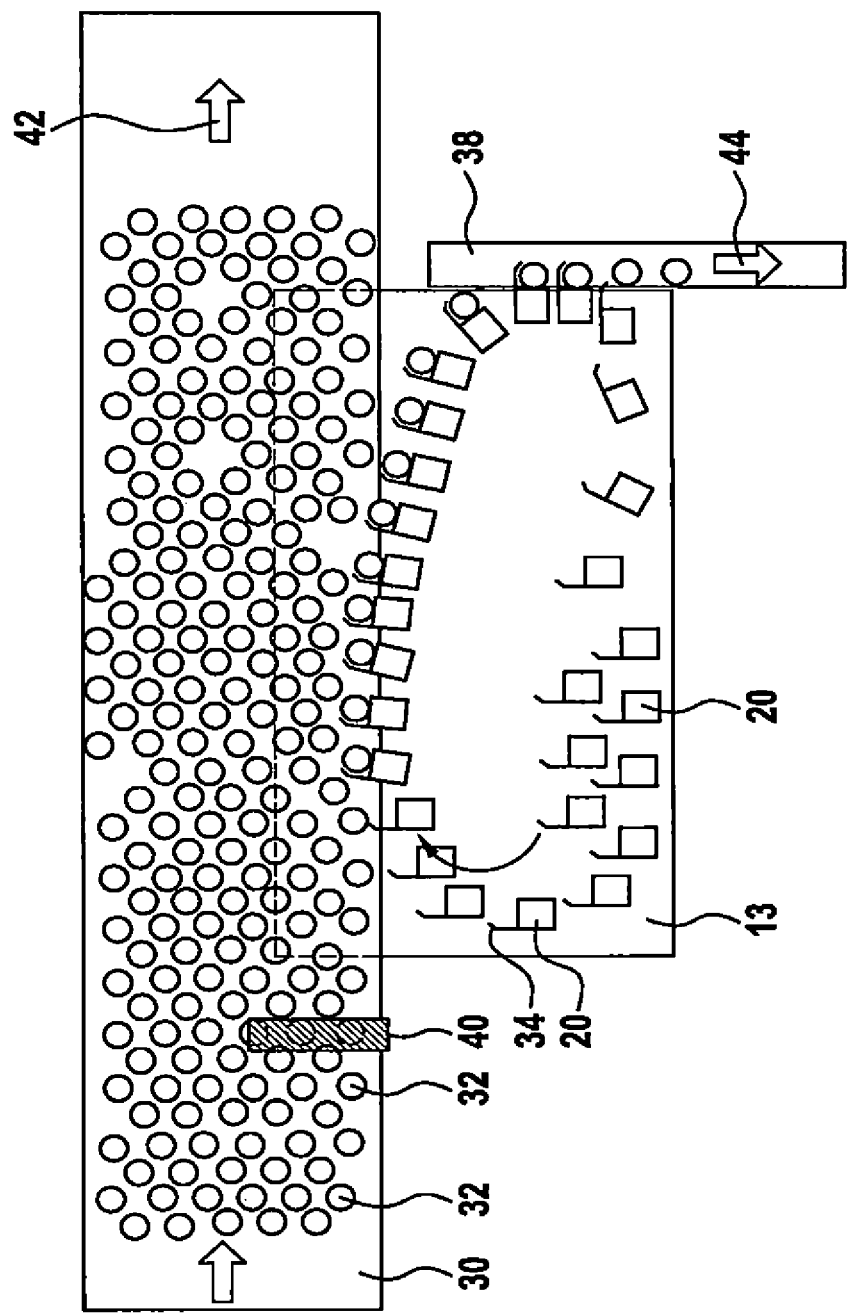
FIG. 6 shows a plan view of a further transportation system having an outfeed belt that runs perpendicularly to the infeeding direction.

The exemplary embodiment according to FIG. 6 differs from that of the preceding FIGS. 3 to 5 in that the further transportation system 38 is now disposed so as to be transverse to the transportation direction 42 of the transportation system 30. Said further transportation system 38 is located so as to be parallel with the end side of the propulsion surface 13. However, said further transportation system 38 does not cover the propulsion surface 13. Rather, it is ensured by way of the corresponding shaping of the activation means 34 that the mover 20 can shunt the products 32 to the further transportation system 38. The products 32 herein are initially shunted from the transportation system 30 directly onto the propulsion surface 13. The mover 20 moves the respective product 32 in the direction of the end side of the propulsion surface 13. There, the product 32 is preferably brought up to the same speed as that of the further transportation system 38. Accordingly the speed of the product 32 and the speed of the further transportation system 38 approximately, the mover 20 shunts the product 32 onto the further transportation system 38. The surface of the propulsion surface 13 and that of the transportation system 38 herein are particularly preferably at substantially the same height. The movers 20, counter to the transportation direction 42 of the transportation system 30, are subsequently returned back to a location which is adjacent to the periphery of the transportation system 30. Alternatively, depending on the specific application, the propulsion surface can also only partially cover the further transportation system 38.

Figure 7:
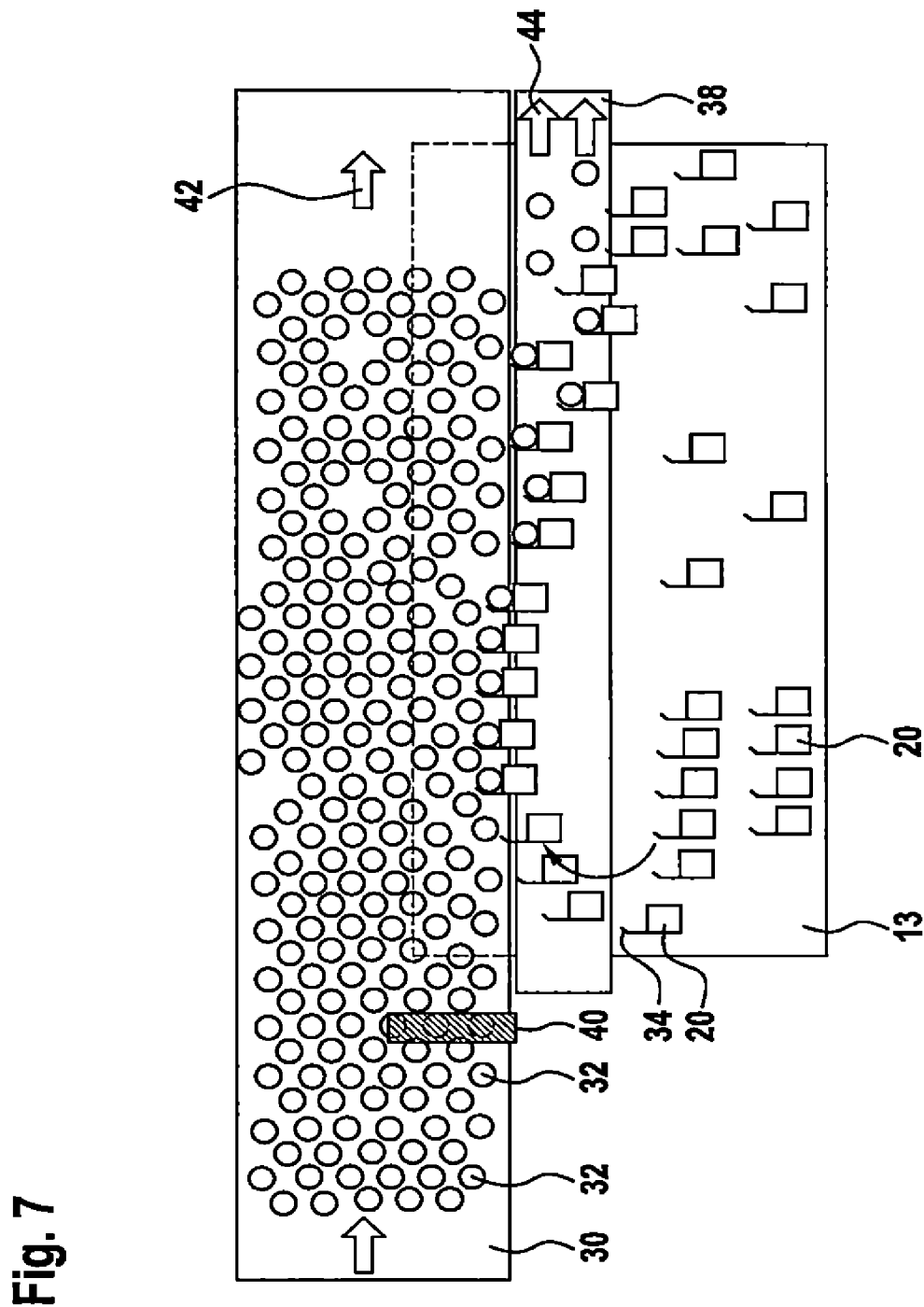
FIG. 7 shows a plan view of a further transportation system, a plurality of products lying beside one another being able to be fed out on the outfeed belt of said transportation system.

The exemplary embodiment according to FIG. 7 differs from that of FIGS. 3 to 5 only in that the products 32 on the further transportation system 38 are now disposed in two rows so as to be parallel with the transportation direction 44, for example. The flexibility of the grouping or disposing of the products 32, respectively, is thus further increased. Alternatively, two or a plurality of belts or transportation systems 38, respectively, could also be provided, preferably one belt per product column.

Figure 8:
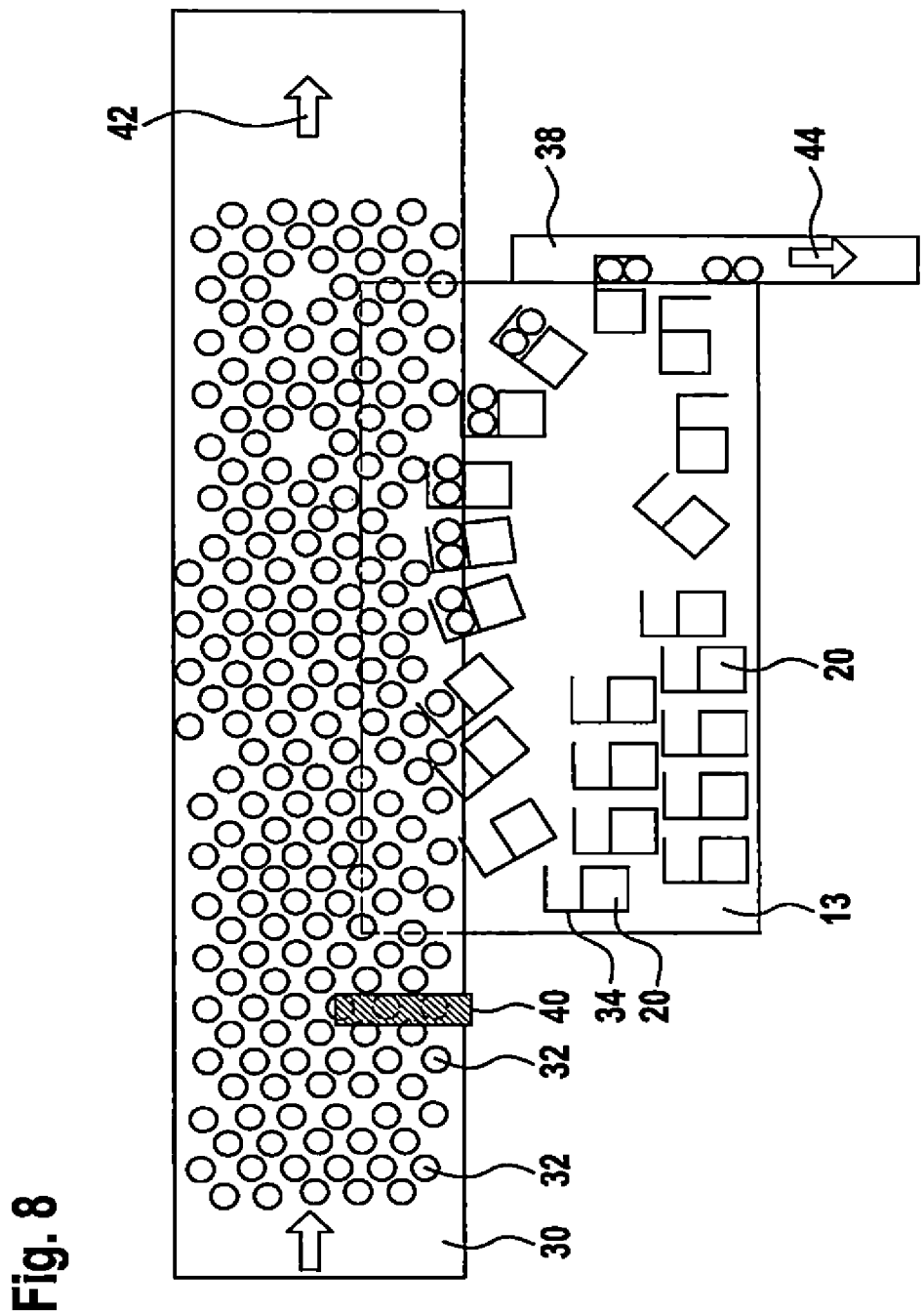
FIG. 8 shows a plan view of a further transportation system having a mover which can move a plurality of products simultaneously.

The exemplary embodiment according to FIG. 8 differs from that of FIG. 6 in that the activation means 34 is now configured such that one mover 20 can receive a plurality of products 32 simultaneously. Two products 32 which are received by a single mover 20 are now illustrated in an exemplary manner. To this end, the activation means is configured in a L-shaped manner, for example. However, there is no change in terms of the procedure in principle.

Figure 9:
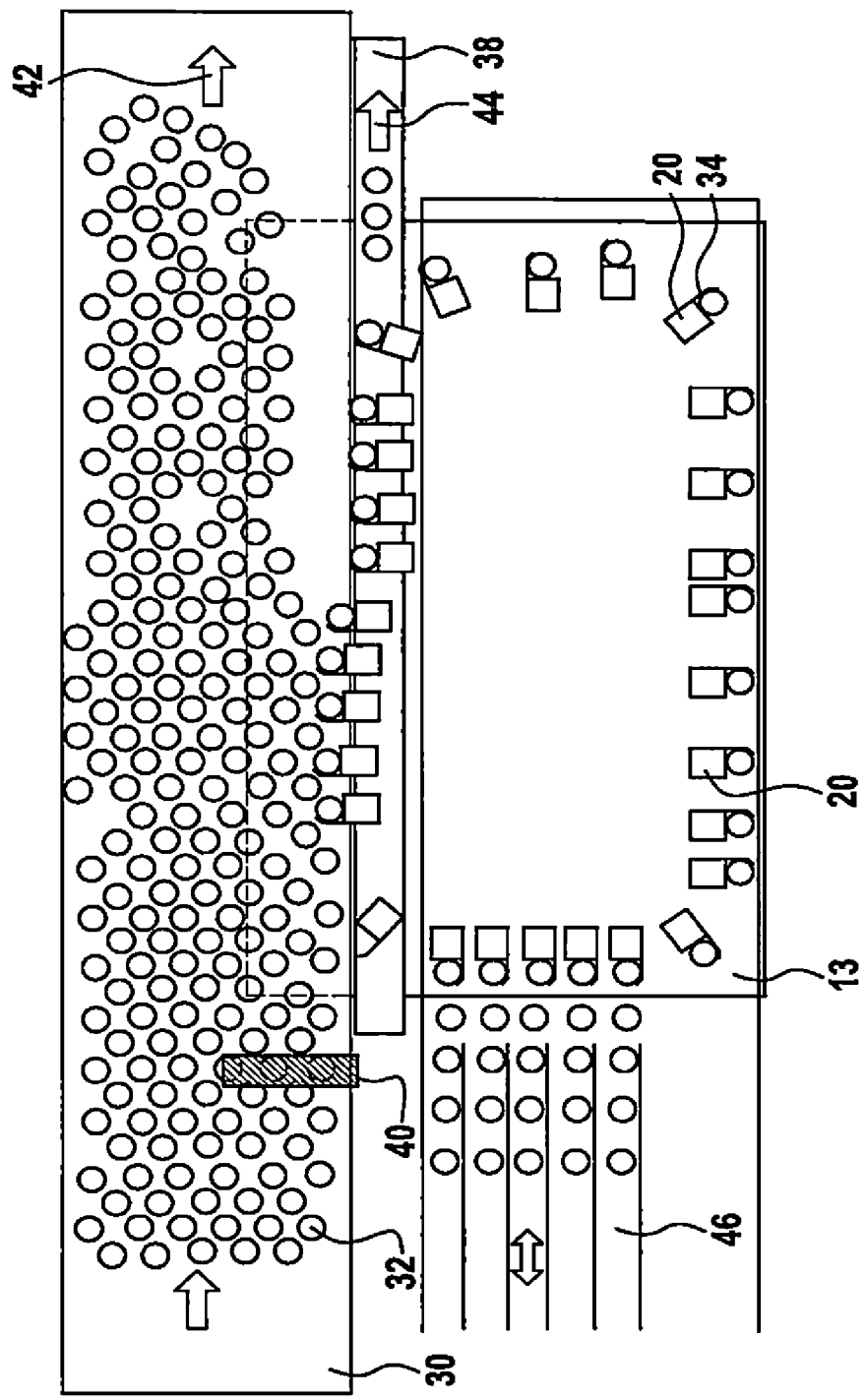
FIG. 9 shows a plan view of a further transportation system having a buffer or storage function, respectively.

The exemplary embodiment according to FIG. 9 differs from that of FIGS. 3 to 5 in that a buffer 46 is provided. Said buffer 46 can be a further transportation system which is a gain disposed between the propulsion surface 13 and the mover 20. The buffer 46 in the exemplary embodiment is disposed so as to be parallel with the transportation system 30, wherein the further transportation system 38 is disposed between the buffer 46 and the transportation system 30. Said further transportation system 38 herein receives products 32 in a plurality of rows that are parallel with the transportation direction 42. The movers 20 move the products 32 that are infed from the transportation system 30 by way of the further transportation system 38 onto the buffer 46. Depending on the target position, the products 32 reach the desired rows of the buffer 46. The buffered products 32 can optionally be transferred onto the further transportation system 38 at a later point in time.

The transportation systems 30, 38 are preferably configured as transportation belts such as, for example, infeed belts or outfeed belts. On account of the transportation system 30, 38 being disposed between the mover 20 and the transportation surface 13, it becomes possible for the activation means 34 of the mover 20, or else the mover 20 per se, to shunt products 32 from the transportation system 30. Since there is a spacing 36 between the mover 20 and the propulsion surface 13, the transportation system, or the belt of the transportation system, 30, 38, respectively, on which the products 32 are transported can run in this spacing 36. A product detector 40 which is based on image monitoring, for example, acquires the location of the products 32. The movers 20 are controlled in such a manner that the products 32 can be removed from the transportation system 30 in a targeted manner and be fed to further machines and/or transportation systems 38. The arrangement is distinguished by particular flexibility. The transportation systems 30, 38 can thus be selected and disposed so as to have dissimilar angles, so as to be parallel with the transportation direction 42, or so as to have opposite transportation directions, or else so as to have dissimilar belt geometries. Movers 20 in conjunction with the propulsion surface 13 that is required for movement are employed only where the functions of the former are required. Comparatively long transportation paths can continue to be implemented using more cost-effective transportation systems 30, 38 such as belts, chains, etc.

As has already been shown in FIG. 9, a product buffer function can also be implemented by way of the system. For example, if a downstream machine is stopped, the products 32 can be buffered on the buffer 46, or the storage belt, respectively. Moreover, only individual products 32 can also be infed to the buffer 46, or be removed from the buffer 46 in a targeted manner, respectively.

Specifically in the case of the products 32 being infed in a non-organized manner, the product detector 40 ensures that the position of a product 32 to be transferred can be accurately acquired and can be approached by the mover 20 in a targeted manner in order for said product 32 to be shunted. The speed of the transportation system 30 is also taken into account herein. The products 32 can thus be placed onto the transportation system 30 in a non-sorted and non-organized manner, since a targeted transfer is subsequently possible by way of the movers 20. Moreover, arbitrary dissimilar possibilities of transferring products 32, for example in groups, to dissimilar further transportation systems 38 or to further machines or other functions such as the buffer 46 can be implemented. The transportation system 30, 38 could moreover also be utilized for transporting the mover 20 per se. Movers 20 being transported in this way could thus cover even further distances between a plurality of propulsion surfaces 13, or be moved in a targeted manner to a specific location for the purpose of maintenance. The movers 20 conjointly with received products 32 could also be moved and be taken to a further processing station where the transferred mover 20 moves the received product 32 onward across a propulsion surface 13 that is located there.

Figure 10:
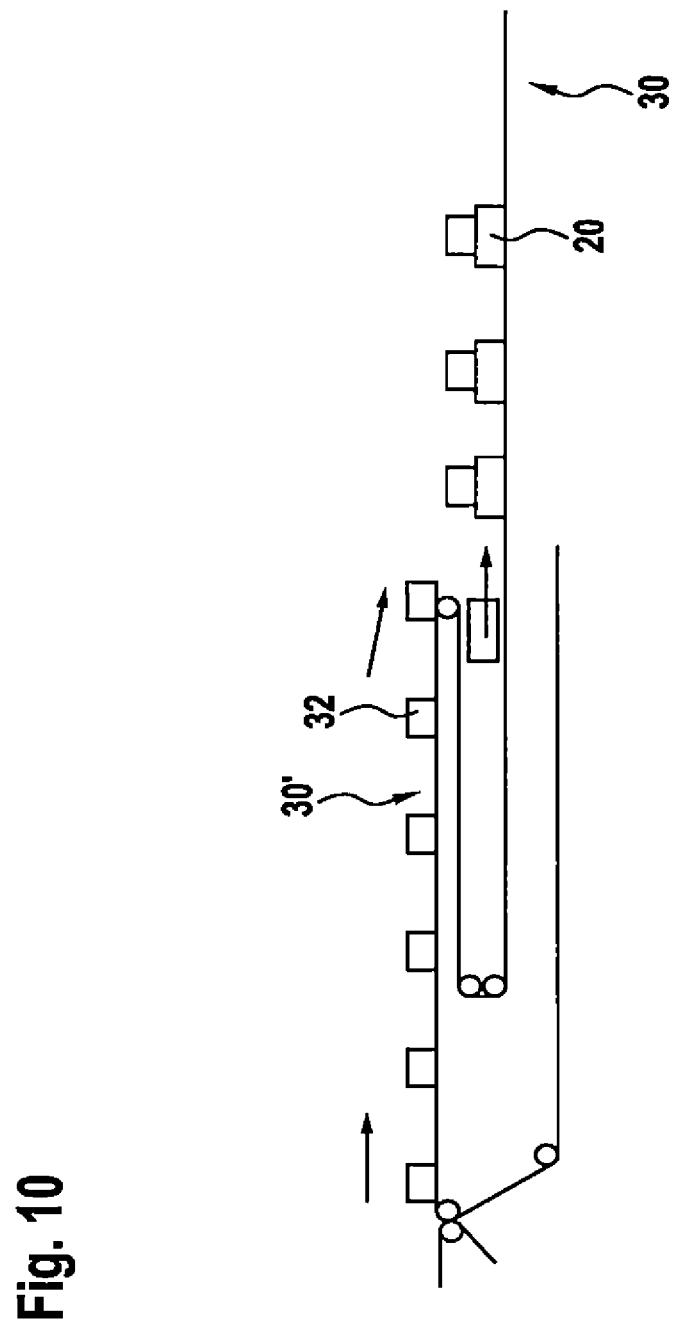
FIG. 10 shows an alternative exemplary embodiment in which the movers carry the products.

In the case of the exemplary embodiment according to FIG. 10, the movers 20 carry the respective products 32. The products 32 are again infed by way of the transportation system 30. The movers 20 wait below that portion of the transportation system 30 that infeeds the products 32, in order for the respective products 32 to be received. In the case of the exemplary embodiment according to FIG. 10, the transportation system 30 after the transfer point is deflected downward in a manner such that the movers 20 are also located above the same transportation system 30 which also infeeds the products 32. Dispensing the product 32 onto the waiting mover 20 is performed at the deflection point. To this end, the upper side of the mover 20 can be configured in a suitable manner. Alternatively, activation means 34 which carry the products 32 in a suitable manner could also be provided. The same belt of the transportation system 30 is deflected such that the latter infeeds the products 32, on the one hand, and is again disposed between the mover 20 and the propulsion surface 13, on the other hand.

Figure 11:
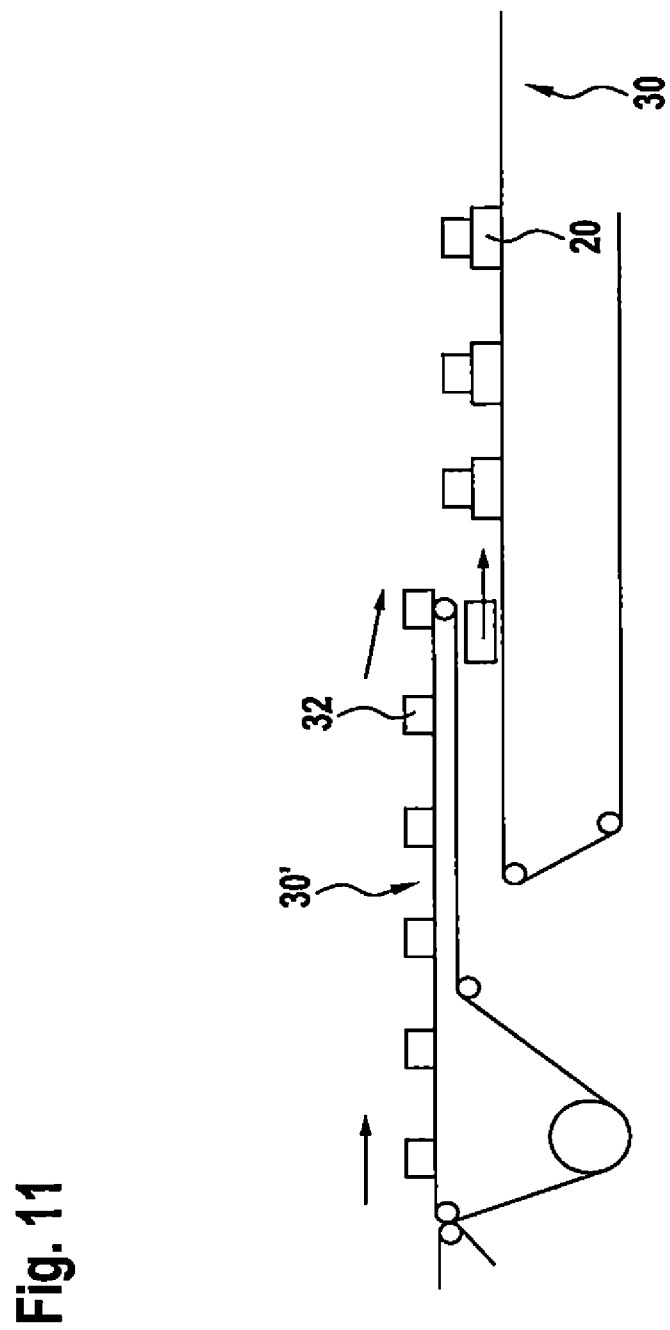
FIG. 11 shows a further alternative exemplary embodiment having dissimilar transportation systems.

Alternatively to the illustration as in FIG. 11, it could be provided that the movers 20 are disposed above a further further transportation system 30 which is independent of the transportation system 30' which infeeds the products 32. The transportation system 30 could moreover have a certain width such that a plurality of products 32 are infed so as to lie beside one another. Each mover 20 is synchronized and positioned below the transportation system 30', in a manner corresponding to the incoming product 32, and receives the infed product 32 in a suitable manner. Depending on the specific application, the product 32 thus received can subsequently be infed to the further transportation system 38.

Figure 12:
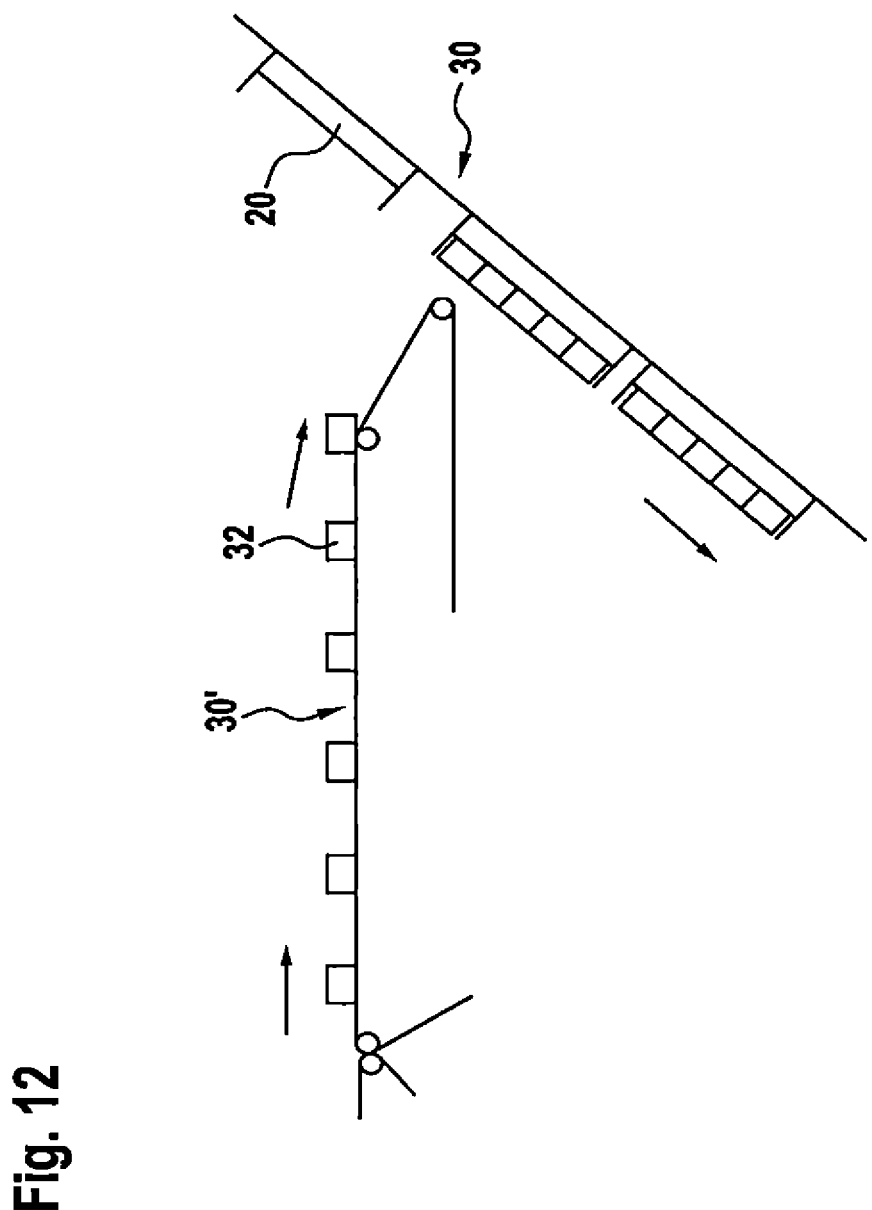
FIG. 12 shows an obliquely disposed transportation system, wherein one mover can receive a plurality of products.

The exemplary embodiment according to FIG. 12 differs from that of FIG. 11 in that the transportation system 30 is disposed so as to be oblique. The movers 20 moreover have receptacle means such that the products 32 that are infed by way of the transportation system 30' cannot slip away, despite the oblique orientation of the movers 20 so as to be parallel with the transportation plane of the transportation system 30. Moreover, a plurality of products 32 can also be put on a single mover 20 and be transported by the latter.

Figure 13:
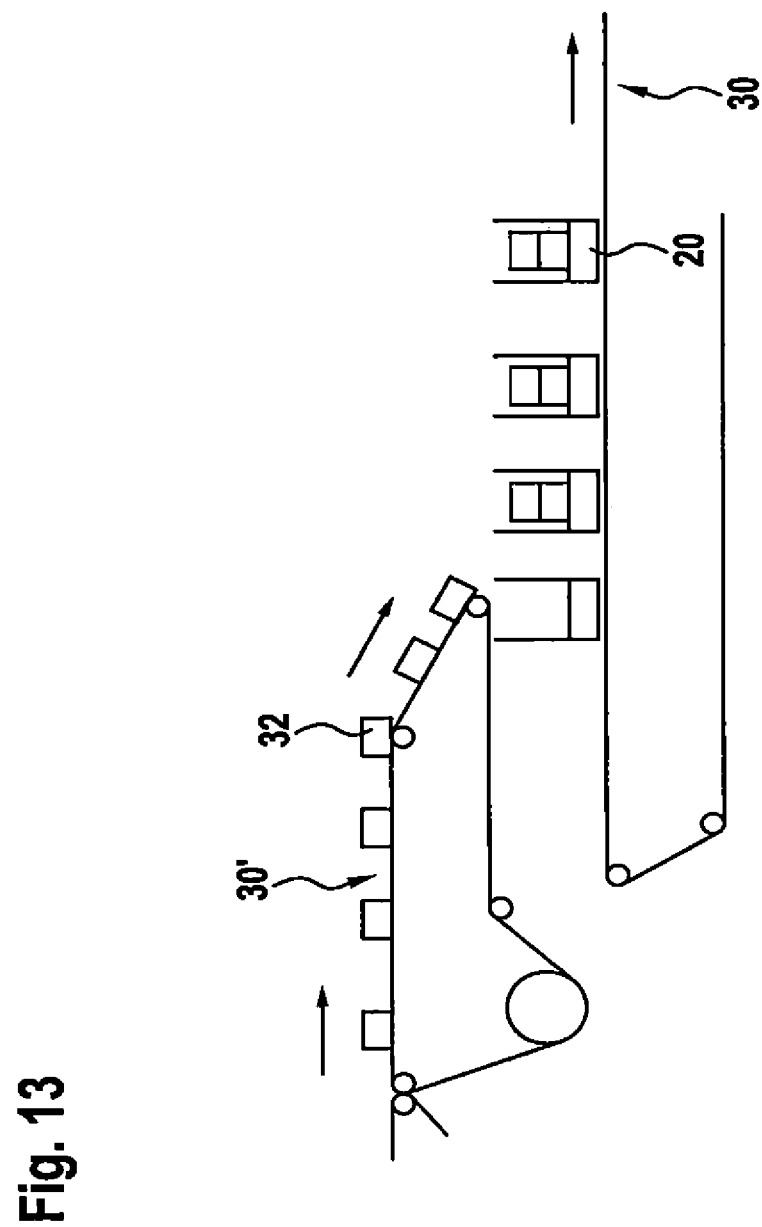
FIG. 13 shows a further alternative exemplary embodiment in which a plurality of products in the form of a stack are infed to one mover.

The exemplary embodiment according to FIG. 13 differs from that of FIG. 11 in that a plurality of products 32 can be received by a single mover 20. The products 32 to be received are stacked on top of one another, for example. The transportation system 30 is again disposed between the mover 20 and the propulsion surface 13. Moreover, still further products 32 can be stacked or loaded, respectively, and be transported onward. The mover 20, for example, can thus wait until the second or next product 32, respectively, has also been received. Alternatively, the mover 20 could on each occasion also approach a new loading position and thus stack products 32 on top of one another.

The exemplary embodiment according to FIG. 14 differs from that of FIG. 11 in that a plurality of products 32 can now be received in an oblique manner on a single mover 20. To this end, the mover 20 has a support element that is preferably disposed in an oblique manner and receives the first infed product 32. The further products 32 are infed subsequently in that the mover 20 successively approaches the next stowing position for the next product 32.

Alternatively, the products 32 can also be transferred into a packaging material such as, for example, a film/foil which is provided in a suitable manner by the further transportation system 38. The mover 20 thus transfers the products 32 into the packaging material, for example. The packaging material, thus also the products 32 transferred thereto, can be infed to further processing steps. This herein could be a bag forming and filling machine, for example, which in a manner known per se forms the packaging material to a tubular bag and thus packs the product 32 therein.

Alternatively, the movers 20 can be used merely such that the products 32 that are infed on the transportation system 30 are merely displaced or rearranged, respectively, on said transportation system 30 by the movers 20. The movers 20, specifically in the case of products 32 that are infed in a non-organized manner, serve for establishing organized groups and/or organized rows and/or organized product spacings on the transportation system 30.

Arbitrary handling functions such as, for example, stacking or grouping, etc., can be carried out between the products 32 being removed or transferred from the transportation system 30, respectively, and being dispensed to the further transportation system 38 and/or the buffer 46.

When a plurality of products 32 are transported by a single mover 20, the output increases at the same dynamics of the mover 20. Moreover, flexibility is increased when the mover 20 is capable of transporting only one product 32 or entire groups of products 32, depending on requirements. Accordingly, a mix of individual products and of groups becomes possible. Different groupings are also possible per se.

The device is a component part of a flexible transportation system for various applications in the field of transportation, in particular in packaging technology in the pharmaceutical or foodstuff sectors, for example. However, the use is not limited thereto.

The invention claimed is:

1. A device for transferring products (32), comprising at least one mover (20) which has at least one permanent magnet (19) which is connected to the mover (20), wherein the permanent magnet (19) interacts with at least one coil plane (18) of a propulsion surface (13) for driving the mover (20) in particular in a non-contacting manner, wherein the mover is actuated such that the mover is displaceable and rotatable in at least two degrees of freedom, furthermore comprising at least one transportation system (30, 38) which transports products (32), characterized in that the transportation system (30, 38) is disposed between the propulsion surface (13) and the mover (20).

2. The device as claimed in claim 1, characterized in that at least one product detector (40) or sensor is provided in the region of the transportation system (30).

3. The device as claimed in claim 2, characterized in that the mover (20) approaches a specific position depending on the product detector (40) or the sensor, so as to move the identified or sensed product (32), respectively.

4. The device as claimed in claim 1, characterized in that the mover (20) is brought up to a speed which corresponds approximately to a speed of the transportation system (30, 38).

5. The device as claimed in claim 1, characterized in that the mover (20) moves at least one product (32) relative to the transportation system (30, 38).

6. The device as claimed in claim 1, characterized in that at least one further transportation system (38) is provided so as to be adjacent to the transportation system (30) and/or to the propulsion surface (13).

7. The device as claimed in claim 6, characterized in that the mover (20) moves the at least one product (32) onto the transportation system (30) and/or onto the further transportation system (38) and/or onto a buffer (46) and/or onto a packaging material.

8. The device as claimed in claim 6, characterized in that the mover (20) upon transferring at least one product (32) to the further transportation system (38) reaches a region of the propulsion surface (13) that is not covered by the transportation system (30, 38).

9. The device as claimed in claim 6, characterized in that the further transportation system (38) is disposed between the propulsion surface (13) and the mover (20).

10. The device as claimed in claim 6, characterized in that the mover (20), in particular in a shunting manner, transfers the at least one product (32) from the one transportation system (30) to the further transportation system (38).

11. The device as claimed in claim 1, characterized in that the mover (20) comprises at least one activation means (34) which for transporting at least one product (32) comes into contact with the at least one product.

12. The device as claimed in claim 1, characterized in that at least one mover (20) moves the at least one product (32) to a position which depends on a position of a product (32) that has already been moved by a mover (20).

13. The device as claimed in claim 1, characterized in that the propulsion surface (13) is not completely covered by the transportation system (30) and/or by the further transportation system (38).

14. The device as claimed in claim 1, characterized in that the mover (20) moves at least two products (32).

15. The device as claimed in claim 1, characterized in that the transportation system (30, 38) is a transportation belt.

16. The device as claimed in claim 1, characterized in that at least one product detector (40) or sensor is provided in the region of the transportation system (30), outside the propulsion surface (13).

17. The device as claimed in claim 1, characterized in that the mover (20) moves at least one product (32) relative to the transportation system (30, 38) so as to provide said product (32) with a change of direction or a rotation.

18. The device as claimed in claim 6, characterized in that the mover (20), in a shunting manner, transfers the at least one product (32) from the one transportation system (30) to the further transportation system (38).

19. A device for transferring products (32), comprising at least one mover (20) which has at least one permanent magnet (19) which is connected to the mover (20), wherein the permanent magnet (19) interacts with at least one coil plane (18) of a propulsion surface (13) for driving the mover (20) in particular in a non-contacting manner, furthermore comprising at least one transportation system (30, 38) which transports products (32), characterized in that the transportation system (30, 38) is disposed between the propulsion surface (13) and the mover (20), the at least one further transportation system (38) is provided so as to be adjacent to the transportation system (30) and/or to the propulsion surface (13), and the mover (20) upon transferring at least one product (32) to the further transportation system (38) reaches a region of the propulsion surface (13) that is not covered by the transportation system (30, 38).

20. A device for transferring products (32), comprising at least one mover (20) which has at least one permanent magnet (19) which is connected to the mover (20), wherein the permanent magnet (19) interacts with at least one coil plane (18) of a propulsion surface (13) for driving the mover (20) in particular in a non-contacting manner, furthermore comprising at least one transportation system (30, 38) which transports products (32), characterized in that the transportation system (30, 38) is disposed between the propulsion surface (13) and the mover (20), the at least one further transportation system (38) is provided so as to be adjacent to the transportation system (30) and/or to the propulsion surface (13), and the further transportation system (38) is disposed between the propulsion surface (13) and the mover (20).

* * * * *